United States Patent
Odahara et al.

(10) Patent No.: US 9,113,100 B2
(45) Date of Patent: Aug. 18, 2015

(54) SOLID-STATE IMAGING DEVICE, DRIVING METHOD, AND ELECTRONIC APPARATUS

(71) Applicant: Sony Corporation, Tokyo (JP)

(72) Inventors: Masaki Odahara, Kanagawa (JP); Takaki Watanabe, Kanagawa (JP); Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 13/772,473

(22) Filed: Feb. 21, 2013

(65) Prior Publication Data

US 2013/0240711 A1 Sep. 19, 2013

(30) Foreign Application Priority Data

Mar. 14, 2012 (JP) .................................. 2012-057116

(51) Int. Cl.
- *H04N 5/359* (2011.01)
- *H04N 5/378* (2011.01)
- *H04N 5/361* (2011.01)

(52) U.S. Cl.
CPC ............. *H04N 5/378* (2013.01); *H04N 5/3598* (2013.01); *H04N 5/361* (2013.01)

(58) Field of Classification Search
USPC ................. 250/208.1; 348/241, 251, E3.021, 348/E5.08; 257/223
See application file for complete search history.

(56) References Cited

U.S. PATENT DOCUMENTS

2011/0234867 A1* 9/2011 Sato et al. ..................... 348/294

FOREIGN PATENT DOCUMENTS

JP 2005-278135 A 10/2005
JP 2008-103647 A 5/2008

* cited by examiner

*Primary Examiner* — Renee D Chavez
(74) *Attorney, Agent, or Firm* — Fishman Stewart Yamaguchi PLLC

(57) ABSTRACT

Disclosed is a solid-state imaging device including a pixel array, a pixel signal generation part, and a control part. The pixel signal generation part includes a comparator and a counter. In a case where an enable signal is supplied from the control part, a count value of the counter in a D-phase period where a signal level is detected is set as a limit value regardless of an output of the comparator when a count value of the counter in a P-phase period where a reset level is detected is a limit value.

8 Claims, 11 Drawing Sheets

SOLID-STATE IMAGING DEVICE, DRIVING METHOD, AND ELECTRONIC APPARATUS

BACKGROUND

The present disclosure relates to a solid-state imaging device, a driving method, and an electronic apparatus, and in particular, to a solid-state imaging device, a driving method, and an electronic apparatus allowing an image sensor to obtain natural and beautiful images.

In recent years, CMOS image sensors have been widely used as imaging devices. In addition, CMOS image sensors improved to be more suited to high-speed imaging have also been proposed. For example, a CMOS image sensor has been proposed that uses up/down counters to attain a high frame rate and high resolution without increasing its circuit size (see Japanese Patent Application Laid-open Nos. 2008-103647 and 2005-278135).

In such a CMOS image sensor, the up/down counters perform a down-count operation for the first time and an up-count operation for the second time, thereby automatically performing subtraction processing (a comparison period for the second time—a comparison period for the first time). Then, the polarity of the outputs of comparators is inverted when a reference voltage becomes equal to the signal voltages of column signal lines. With the polarity inversion, the up/down counters stop their counting operations. As a result, the up/down counters hold a count value corresponding to the result of the subtraction processing (the comparison period for the second time—the comparison period for the first time).

By the twice reading operations and the subtraction processing of the up/down counters, an offset component for each ADC is also eliminated in addition to a reset component including fluctuations for each unit pixel. Therefore, only a signal component corresponding to an incident light amount for each unit pixel can be extracted.

Such processing of eliminating a reset component including fluctuations for each unit pixel is so-called CDS (Correlated Double Sampling) processing.

A period where the up/down counters perform the down-count operation is called a P-phase (Reset Phase) period, and a period where the up/down counters perform the up-count operation is called a D-phase (Data Phase) period.

However, in a case where the pixels of the CMOS image sensor are irradiated with high illumination light such as sunlight, charges photoelectrically converted by photodiodes may leak to floating diffusions.

In such a case, it is difficult to accurately count the reset components of the pixels. Therefore, the up/down counters fully count a clock signal in the P-phase period (i.e., count-down to a limit).

Then, because the difference between the count value of the clock signal in the P-phase period and that of the clock signal in the D-phase period becomes small, output values representing pixel signals also become small. As a result, a phenomenon occurs where the pixels to be displayed in, for example, white (bright color) are displayed in black. Such a phenomenon is also called a blackening phenomenon.

In order to prevent the blackening phenomenon, there have been taken some measures from the past. According to one measure, the count value of the clock signal in the P-phase period is monitored to set flags to the pixels where the blackening phenomenon may occur, and the count value of the clock signal in the D-phase period of the pixels is uniformly corrected to a maximum value.

SUMMARY

However, the blackening phenomenon may not occur due to sunlight. For example, the blackening phenomenon may occur due to burst noise caused by the high gain of a circuit or the like.

The burst noise may be caused in, for example, the optical black areas of a pixel array. According to a known technology, the output values of the pixel signals are also corrected with respect to the blackening phenomenon that occurs in the optical black areas.

The optical black areas are originally areas where reference signals for detecting the levels of black pixel signals are generated. Therefore, if the count value in the D-phase period is uniformly corrected to a maximum value with respect to the pixels in the areas, the color of an entire image may not be normally displayed.

The present disclosure has been made in view of the above circumstances, and it is therefore desirable to allow an image sensor to obtain natural and beautiful images.

According to an embodiment of the present disclosure, there is provided a solid-state imaging device including a pixel array, a pixel signal generation part, and a control part. The pixel array has a plurality of pixels arranged therein. Each of the pixels has a charge holding part configured to hold a voltage corresponding to a charge obtained by a photoelectric conversion part. The pixel signal generation part is configured to generate a pixel signal by calculating a difference between a signal level representing the voltage held by the charge holding part so as to correspond to the charge obtained by the photoelectric conversion part of the pixel and a reset level representing a voltage of the charge holding part in a reset state. The control part is configured to control the pixel signal generation part. The pixel signal generation part includes a comparator and a counter. The comparator is configured to compare the voltage of the charge holding part with a reference voltage. The counter is configured to count a clock in accordance with a comparison result output from the comparator. In a case where an enable signal is supplied from the control part, a count value of the counter in a D-phase period where the signal level is detected is set as a limit value regardless of an output of the comparator when a count value of the counter in a P-phase period where the reset level is detected is a limit value.

The pixel array may have the plurality of pixels arranged in a two-dimensional matrix form. The pixel signal generation part may be provided for each of columns of the pixels of the pixel array. The counter of the pixel signal generation part provided corresponding to a predetermined one of the columns of the pixel array may be configured to count the clock in accordance with the output of the comparator in the D-phase period regardless of whether the enable signal is supplied from the control part.

The pixels of the predetermined column of the pixel array may be pixels of an optical black area.

The pixel array may have the plurality of pixels arranged in a two-dimensional matrix form. The pixel signal generation part may be provided for each of columns of the pixels of the pixel array. The control part may be configured to output the enable signal when the pixel signal generation part is configured to generate the pixel signal related to the pixels of a predetermined one of rows.

The pixels of the predetermined row may be pixels of a non-optical black area.

A blackening phenomenon occurring when the charge photoelectrically converted by the photoelectric conversion part leaks to the charge holding part may be corrected by the supply of the enable signal from the control part.

According to another embodiment of the present disclosure, there is provided a driving method. The driving method includes arranging a plurality of pixels in a pixel array, each of the pixels having a charge holding part configured to hold a voltage corresponding to a charge obtained by a photoelectric conversion part; generating, by a pixel signal generation part, a pixel signal by calculating a difference between a signal level representing the voltage held by the charge holding part so as to correspond to the charge obtained by the photoelectric conversion part of the pixel and a reset level representing a voltage of the charge holding part in a reset state; and controlling, by a control part, the pixel signal generation part. The pixel signal generation part includes a comparator and a counter. The comparator is configured to compare the voltage of the charge holding part with a reference voltage. The counter is configured to count a clock in accordance with a comparison result output from the comparator. In a case where an enable signal is supplied from the control part, the pixel signal generation part sets as a limit value a count value of the counter in a D-phase period where the signal level is detected regardless of an output of the comparator when a count value of the counter in a P-phase period where the reset level is detected is a limit value.

According to still another embodiment of the present disclosure, there is provided an electronic apparatus including a solid-state imaging device. The solid-state imaging device includes a pixel array, a pixel signal generation part, and a control part. The pixel array has a plurality of pixels arranged therein. Each of the pixels has a charge holding part configured to hold a voltage corresponding to a charge obtained by a photoelectric conversion part. The pixel signal generation part is configured to generate a pixel signal by calculating a difference between a signal level representing the voltage held by the charge holding part so as to correspond to the charge obtained by the photoelectric conversion part of the pixel and a reset level representing a voltage of the charge holding part in a reset state. The control part is configured to control the pixel signal generation part. The pixel signal generation part includes a comparator and a counter. The comparator is configured to compare the voltage of the charge holding part with a reference voltage. The counter is configured to count a clock in accordance with a comparison result output from the comparator. In a case where an enable signal is supplied from the control part, a count value of the counter in a D-phase period where the signal level is detected is set as a limit value regardless of an output of the comparator when a count value of the counter in a P-phase period where the reset level is detected is a limit value.

In the embodiments of the present disclosure, the pixel signal is generated by calculating the difference between the signal level representing the voltage held by the charge holding part so as to correspond to the charge obtained by the photoelectric conversion part of the pixel and the reset level representing the voltage of the reset charge holding part. In addition, the clock is counted in accordance with the comparison result output from the comparator configured to compare the voltage of the charge holding part with the reference voltage. Moreover, in a case where the enable signal is supplied, the count value in the D-phase period where the signal level is detected is set as the limit value regardless of the output of the comparator when the count value in the P-phase period where the reset level is detected is the limit value.

According to the embodiments of the present disclosure, it is possible to allow an image sensor to obtain natural and beautiful images.

These and other objects, features and advantages of the present disclosure will become more apparent in light of the following detailed description of best mode embodiments thereof, as illustrated in the accompanying drawings.

DETAILED DESCRIPTION OF EMBODIMENT

Hereinafter, an embodiment of the present disclosure will be described above with reference to the drawings.

Figure 1:
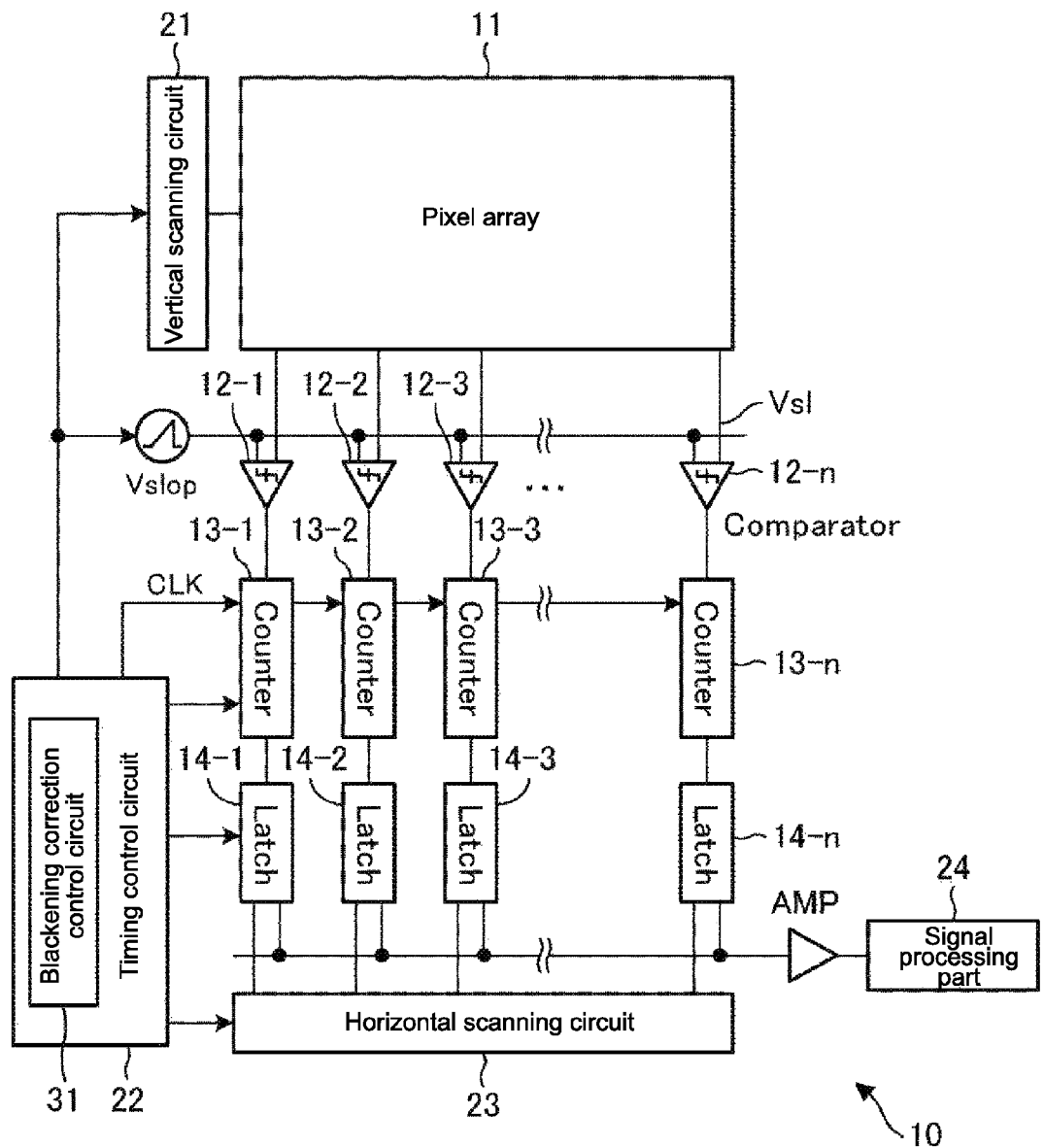
FIG. 1 is a block diagram showing a configuration example of a solid-state imaging device to which an embodiment of the present disclosure is applied.

FIG. 1 is a block diagram showing a configuration example of a solid-state imaging device to which the embodiment of the present disclosure is applied. A solid-state imaging device 10 shown in FIG. 1 is configured as, for example, a CMOS image sensor.

The CMOS image sensor 10 shown in FIG. 1 has a pixel array 11, comparators 12-1 to 12-n, up/down counters (denoted as Counters) 13-1 to 13-n, and latch circuits (denoted as Latches) 14-1 to 14-n.

In addition, the CMOS image sensor 10 has a vertical scanning circuit 21, a timing control circuit 22, a horizontal scanning circuit 23, and a signal processing part 24.

The pixel array 11 has a plurality of pixels arranged in a two-dimensional matrix form. Each of the pixels arranged in the pixel array 11 receives light and performs photoelectric conversion, thereby outputting a voltage value corresponding to an amount of the received light. Vertical signal lines are provided corresponding to the columns of the pixels arranged in the pixel array 11 in the matrix form.

The comparators 12-1 to 12-*n*, the up/down counters 13-1 to 13*n*, and the latch circuits 14-1 to 14-*n* are provided corresponding to the vertical signal lines. Note that the comparators 12-1 to 12-*n* will be simply called comparators 12 below if it is not necessary to distinguish them separately. In addition, the up/down counters 13-1 to 13-*n* and the latch circuits 14-1 to 14-*n* will be simply called up/down counters 13 and latch circuits 14, respectively, if it is not necessary to distinguish them separately.

The comparators 12 compare, for example, the voltage values output from the pixels of each of the columns of the pixel array 11 with a reference voltage (Vslop). Then, the comparators 12 output a predetermined signal when the magnitude relationship between the voltage values output from the pixels and the reference voltage is inverted.

The up/down counters 13 down-count a clock signal (CLK) until the comparators 12 output the predetermined signal in a prescribed P-phase period. In addition, the up/down counters 13 up-count the clock signal until the comparators 12 output the predetermined signal in a prescribed D-phase period.

The up/down counters 13 perform the down-count operation for the first time and the up-count operation for the second time, thereby automatically performing subtraction processing (a comparison period for the second time—a comparison period for the first time). Then, the latch circuits 14 hold a count value corresponding to the result of the subtraction processing (the comparison period for the second time—the comparison period for the first time).

By the twice reading operations and the subtraction processing of the up/down counters 13, an offset component for each ADC is also eliminated in addition to a reset component including fluctuations for each unit pixel. Therefore, only a signal component corresponding to an incident light amount for each unit pixel can be extracted.

Such processing of eliminating a reset component including fluctuations for each unit pixel is so-called CDS (Correlated Double Sampling) processing.

Further, the up/down counters 13 have a blackening correction mechanism that will be described below. The blackening correction mechanism will be described in detail below.

The latch circuits 14 latch the count values of the up/down counters 13.

The vertical scanning circuit 21 is composed of, for example, a shift resistor. The vertical scanning circuit 21 selects pixel driving wiring and applies pixel driving pulses to the selected pixel driving wiring to drive the pixels per row. That is, the vertical scanning circuit 21 sequentially selects and scans the pixels arranged in the pixel array 11 in a vertical direction per row.

The horizontal scanning circuit 23 is composed of, for example, a shift resistor and sequentially outputs horizontal scanning pulses, thereby selecting the respective latch circuits 14-1 to 14-*n* by turns and outputting pixel signals to the signal processing part 24.

The signal processing part 24 applies predetermined processing to the pixel signals supplied from the respective latch circuits 14-1 to 14-*n* to generate image data and outputs the generated image data.

The timing control circuit 22 outputs the pixel driving pulses for driving the respective pixels arranged in the pixel array 11, thereby controlling the vertical scanning circuit 21 and the horizontal scanning circuit 23. In addition, the timing control circuit 22 generates a clock signal and supplies the generated clock signal to the up/down counters 13, while supplying a predetermined control signal to the up/down counters 13 and the latch circuits 14.

Further, the timing control circuit 22 has a blackening correction control circuit 31. The blackening correction control circuit 31 generates a control signal for controlling the operation of the blackening correction mechanisms of the up/down counters 13.

Figure 2:
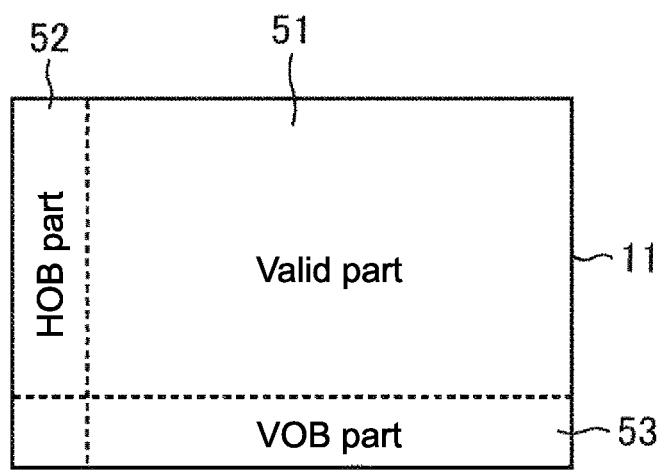
FIG. 2 is a diagram for explaining the areas of a pixel array 11 shown in FIG. 1.

FIG. 2 is a diagram for explaining the areas of the pixel array 11 shown in FIG. 1. As shown in FIG. 2, the light-receiving surface of the pixel array 11 is divided into a valid part 51, an HOB part 52, and a VOB part 53.

The HOB part 52 and the VOB part 53 are provided as optical black areas, and the pixels of the HOB part 52 and the VOB part 53 are generally light-shielded. The pixels arranged in the HOB part 52 and the VOB part 53 generate reference signals for detecting the levels of black pixel signals. For example, based on the reference signals generated by the HOB part 52 and the VOB part 53, pixel signals acquired from the pixels arranged in the valid part (non-optical black area) 51 are corrected when necessary.

Next, a blackening phenomenon will be described.

In a case where the pixels arranged in the pixel array 11 are irradiated with high illumination light such as sunlight, charges photoelectrically converted by photodiodes may leak to floating diffusions.

In such a case, it is difficult to accurately count the reset components of the pixels even if the CDS processing is performed. Therefore, the up/down counters 13 fully count the clock signal in the P-phase period (i.e., countdown to a limit).

Then, because the difference between the count value of the clock signal in the P-phase period and that of the clock signal in the D-phase period becomes small, output values representing the pixel signals also become small. As a result, a phenomenon occurs where the pixels to be displayed in, for example, white (bright color) are displayed in black. Such a phenomenon is also called the blackening phenomenon.

Figure 3:
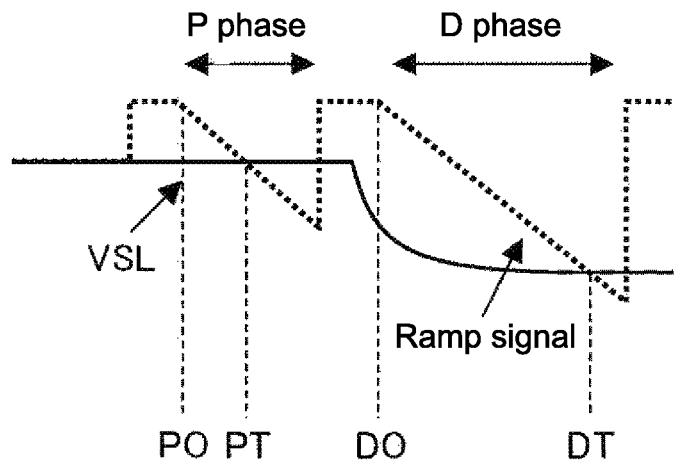
FIG. 3 is a diagram for explaining CDS processing in a case where a blackening phenomenon does not occur.

FIG. 3 is a diagram for explaining the CDS processing in a case where the blackening phenomenon does not occur. FIG. 3 shows a time along the horizontal axis and a voltage value along the vertical axis. In FIG. 3, VSL representing the voltage values output from the pixels is indicated by a solid line, and a ramp signal representing the reference voltage is indicated by dotted lines.

As shown in FIG. 3, the ramp signal gradually decreases from an initial value at a prescribed level in the P-phase period and the D-phase period. As described above, the up/down counters 13 count the clock signal (CLK) until the comparators 12 detect the inversion of the magnitude relationship between the ramp signal and the voltage values VSL and output the predetermined signal. Accordingly, in the P-phase period, the up/down counters 13 start the counting at a time PO and end the counting at a time PT where the dotted lines and the solid line intersect each other in FIG. 3. In addition, in the D-phase period, the up/down counters 13 start the counting at a time DO and end the counting at a time DT where the dotted lines and the solid line intersect each other in FIG. 3.

Figure 4:
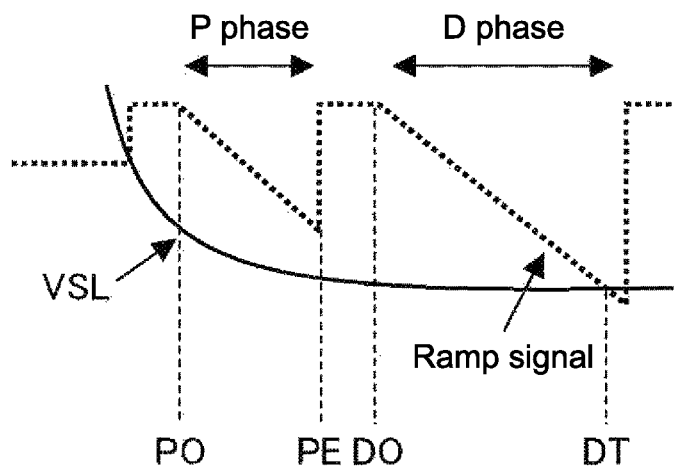
FIG. 4 is a diagram for explaining the CDS processing in a case where the blackening phenomenon occurs.

FIG. 4 is a diagram for explaining the CDS processing in a case where the blackening phenomenon occurs. Similar to FIG. 3, FIG. 4 shows a time along the horizontal axis and a voltage value along the vertical axis. In FIG. 4, VSL representing the voltage values output from the pixels is indicated by a solid line, and a ramp signal representing the reference voltage is indicated by dotted lines.

In the example of FIG. 4, the dotted lines and the solid line do not intersect each other in the P-phase period unlike the case of FIG. 3. That is, because charges photoelectrically converted by the photodiodes leak to the floating diffusions due to the pixels being irradiated with high illumination light such as sunlight, the charges greatly exceeding the original reset level of the pixels are accumulated in the floating diffusions.

In this case, the up/down counters 13 fully count the clock signal in the P-phase period (i.e., countdown to a limit). That is, in the case of the example of FIG. 4, the up/down counters 13 start the counting at the time PO and end the counting at a time PE.

In the case of the example of FIG. 4, because the difference between the count value of the clock signal in the P-phase period and that of the clock signal in the D-phase period becomes small, output values representing the pixel signals also become small. As a result, the pixels to be displayed in, for example, white (bright color) are displayed in black.

In order to prevent the blackening phenomenon, there have been taken some measures. In the CMOS image sensor 10, the count value of the clock signal in the P-phase period is monitored to set flags to the pixels where the blackening phenomenon may occur, and the count value of the clock signal in the D-phase period of the pixels is uniformly corrected to a maximum value.

Figure 5:
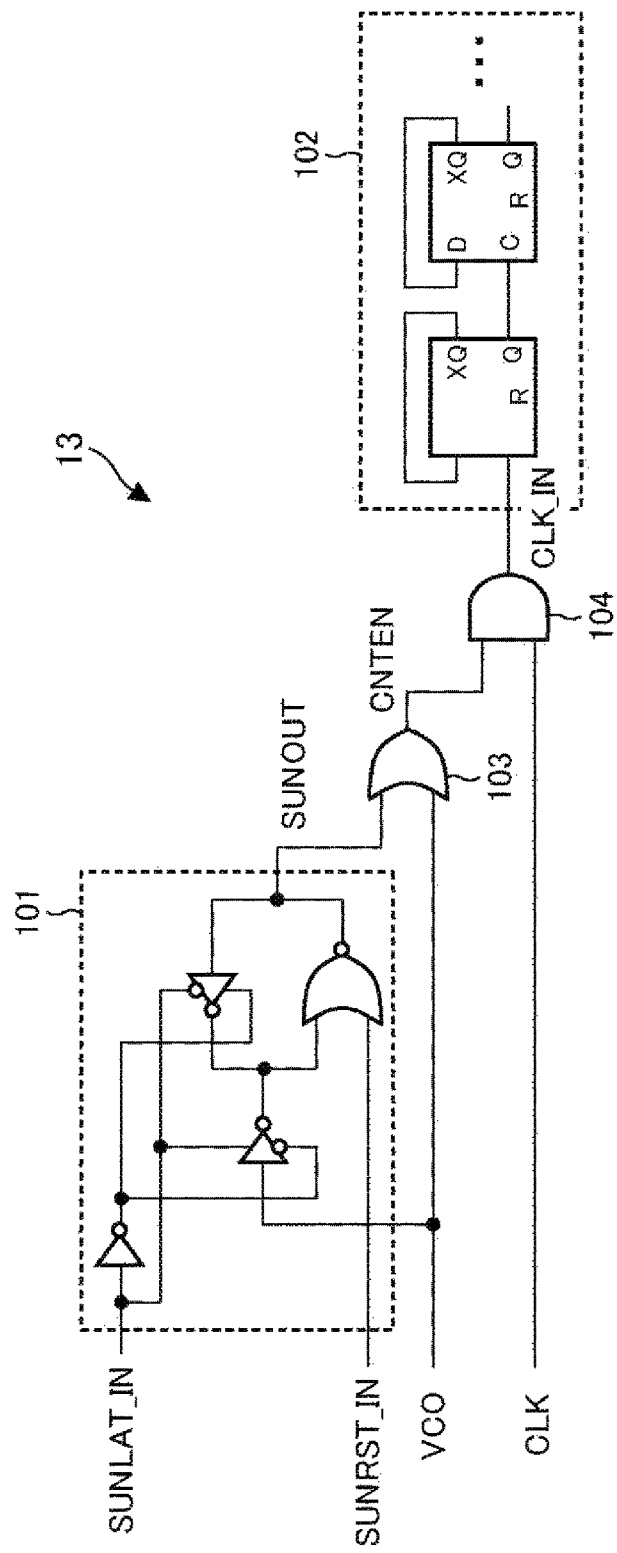
FIG. 5 is a circuit diagram showing an inner configuration example of up/down counters 13.

FIG. 5 is a circuit diagram showing an inner configuration example of the up/down counters 13 and explaining the blackening correction mechanism described above.

As shown in FIG. 5, a comparator-output latch circuit 101 and a counter circuit 102 are provided inside the up/down counter 13. An output SUNOUT of the comparator-output latch circuit 101 is input to an OR gate 103 together with an output VCO of the comparator 12. Moreover, an output CNTEN of the OR gate 103 is input to an AND gate 104 together with the clock signal CLK. Furthermore, the output of the AND gate 104 serves as a clock input CLK_IN to the counter circuit 102.

The comparator-output latch circuit 101 operates with the reception of two input signals SUNLAT_IN and SUNRST_IN. That is, the comparator-output latch circuit 101 latches the output VCO of the comparator 12 at a timing at which the signal SUNLAT_IN is set at "H." Further, the comparator-output latch circuit 101 resets the latched signal at a timing at which the signal SUNRST_IN is set at "H."

Figure 6:
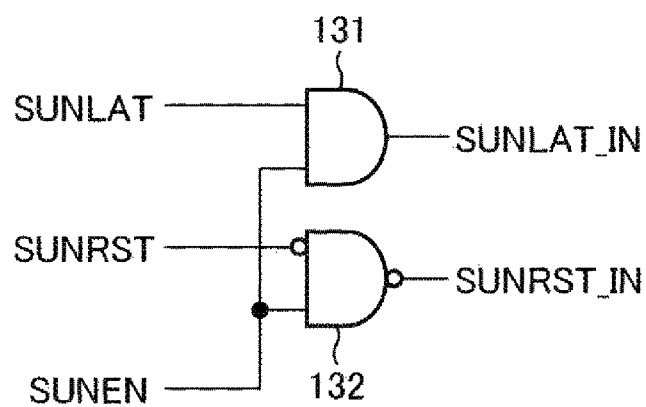
FIG. 6 is a diagram showing a configuration example of a circuit that generates signals input to a comparator-output latch circuit.

FIG. 6 is a diagram showing a configuration example of a circuit that generates the signals SUNLAT_IN and SUNRST_IN input to the comparator-output latch circuit 101. As shown in FIG. 6, three input signals SUNLAT, SUNRST, and SUNEN are supplied to the circuit. In the circuit shown in FIG. 6, the signal SUNLAT_IN is set at "L" and the signal SUNRST_IN is set at "H" when the input signal SUNEN is set at "L." Further, the input signals SUNLAT_IN and SUNRST_IN have the same output levels as those of the input signals SUNLAT and SUNRST, respectively, when the input signal SUNEN is set at "H."

The input signal SUNLAT serves as, for example, pulses output simultaneously with a clock corresponding to an end time in the P-phase period. The input signal SUNRST serves as, for example, pulses output simultaneously with a clock corresponding to a time immediately before the P-phase period starts. The input signal SUNEN serves as, for example, pulses that are generally set at "H" but set at "L" only when the pixels of the rows corresponding to the VOB part 53 of the pixel array 11 are read.

All the input signals SUNLAT, SUNRST, and SUNEN are generated by the blackening correction control circuit 31 inside the timing control circuit 22.

With the circuit configurations described above with reference to FIGS. 5 and 6, the comparator-output latch circuit 101 holds the output of the comparator 12 at the end time of the P-phase period. Thus, based on the output of the comparator-output latch circuit 101, it is possible to determine whether the magnitude relationship between the ramp signal and the voltage value VSL has been inverted at the end time of the P-phase period. For example, when the magnitude relationship between the ramp signal and the voltage value VSL has not been inverted at the end time of the P-phase period, the output SUNOUT of the comparator-output latch circuit 101 is set at "H."

That is, the output SUNOUT of the comparator-output latch circuit 101 can be used as a flag for determining whether the clock signal has been fully counted in the P-phase period about the pixels.

That is, in the up/down counter 13 with the configuration shown in FIG. 5, the output SUNOUT is set at "H" when the clock signal has been fully counted in the P-phase period. Therefore, the magnitude relationship between the ramp signal and the voltage value VSL is inverted in the D-phase period, and the counter circuit 102 continues to perform the counting even after the output VCO of the comparator 12 is set at "L." Thus, the clock signal is fully counted also in the D-phase period.

However, the blackening phenomenon may not occur due to sunlight. For example, the blackening phenomenon may occur due to burst noise caused by the high gain of a circuit or the like.

The burst noise may be caused in, for example, the optical black areas of the pixel array 11. According to a known technology, the output values of the pixel signals are also corrected with respect to the blackening phenomenon that occurs in the optical black areas.

The optical black areas are originally areas where the reference signals for detecting the levels of the black pixel signals are generated. Therefore, if the count value in the D-phase period is uniformly corrected to a maximum value with respect to the pixels in the areas, the color of an entire image may not be normally displayed.

In view of this, the embodiment of the present disclosure prevents blackening correction processing from being applied to the optical black areas.

Figure 7:
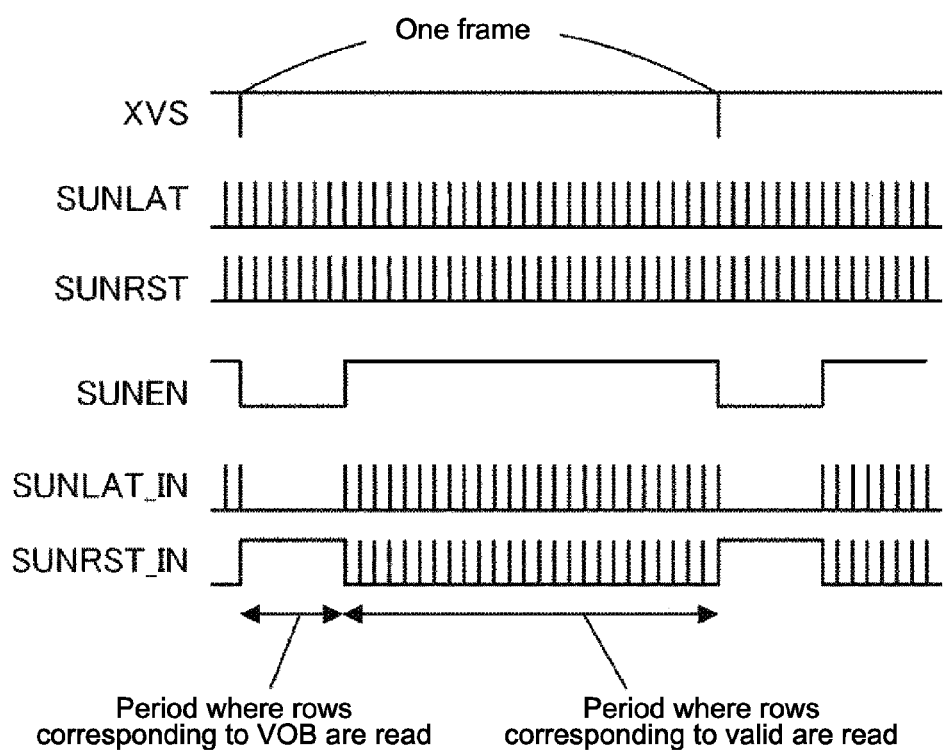
FIG. 7 is a timing chart for explaining the relationship between various signals.

FIG. 7 is a timing chart for explaining the relationship between the input signals SUNLAT, SUNRST, SUNEN, SUNLAT_IN, and SUNRST_IN. In FIG. 7, the horizontal axis shows a time, and the waveforms of the respective signals are arranged in a vertical direction.

A signal XVS shown on the highest side in FIG. 7 serves as a pulse output at the start time of one frame.

As described above, the signal SUNLAT shown on the second-highest side in FIG. 7 serves as, for example, the pulses output simultaneously with the clock corresponding to the end time of the P-phase period.

As described above, the signal SUNRST shown on the third-highest side in FIG. 7 serves as, for example, the pulses output simultaneously with the clock corresponding to the time immediately before the P-phase period starts.

The pulses of the signals SUNLAT and SUNRST are output so as to be substantially synchronized with the start time and the end time of the horizontal scanning period of each of the rows of the pixel array 11.

As described above, the input signal SUNEN shown on the fourth-highest side in FIG. 7 serves as, for example, the pulses that are generally set at "H" but set at "L" only when the pixels of the rows corresponding to the VOB part 53 of the pixel array 11 are read. Note that periods where the input signal SUNEN is set at "H" correspond to periods where the pixels of the rows corresponding to the valid part 51 of the pixel array 11 are read.

The signal SUNLAT_IN shown on the fifth-highest side in FIG. 7 is a signal generated by the circuit described above with reference to FIG. 6 and input to the comparator-output latch circuit 101. In the example of FIG. 7, no pulse of the signal SUNLAT_IN is formed in periods where the input signal SUNEN is set at "L" (i.e., the periods where the pixels of the rows corresponding to the VOB part 53 are read). Therefore, the signal SUNLAT_IN remains at "L."

The signal SUNLAT_OUT shown on the sixth-highest side in FIG. 7 is a signal generated by the circuit described above with reference to FIG. 6 and input to the comparator-output latch circuit 101. In the example of FIG. 7, no pulse of the signal SUNLAT_OUT is formed in the periods where the input signal SUNEN is set at "L" (i.e., the period where the pixels of the rows corresponding to the VOB part 53 are read). Therefore, the signal SUNLAT_OUT remains at "H."

As is clear from FIGS. 5 and 7, the comparator-output latch circuit 101 does not latch the output VCO of the comparator 12 in the periods where the signal SUNLAT_IN is set at "L." In this case, the clock signal is fully counted in the P-phase period but is not fully counted in the D-phase period. That is, according to the embodiment of the present disclosure, it is possible to prevent the blackening correction processing from being applied in the periods where the signal SUNEN is set at "L" (i.e., the periods where the pixels of the rows corresponding to the VOB part 53 are read).

On the other hand, the comparator-output latch circuit 101 latches the output VCO of the comparator 12 in the periods where the signal SUNLAT_IN is set at "H." In this case, the clock signal is fully counted both in the P-phase period and the D-phase period. That is, according to the embodiment of the present disclosure, it is possible to apply the blackening correction processing in the periods where the signal SUNEN is set at "H" (i.e., the periods where the pixels of the rows corresponding to the valid part 51 are read).

Figure 8:
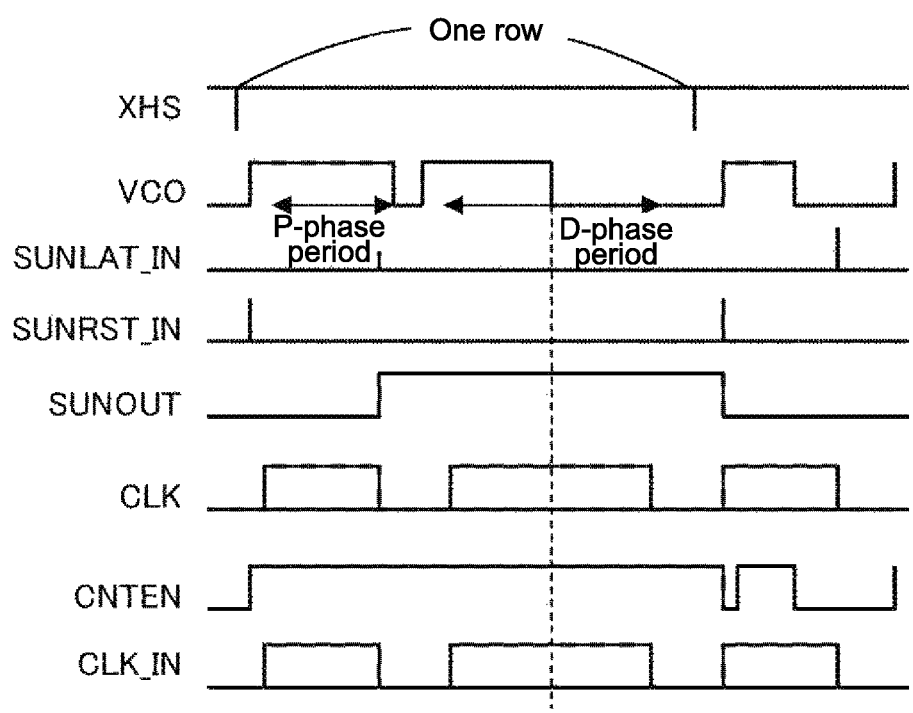
FIG. 8 is a timing chart for explaining the waveforms of the signals in a period where the pixels of rows corresponding to a valid part are read.

FIG. 8 is a timing chart for explaining the waveforms of the respective signals in a period where the pixels of the rows corresponding to the valid part 51 are read.

In FIG. 8, the horizontal axis shows a time, and the waveforms of the respective signals are arranged in a vertical direction.

A signal XHS shown on the highest side in FIG. 8 serves as a pulse output at a time at which the scanning of the pixels of one row is started.

The signal VCO shown on the second-highest side in FIG. 8 serves as the output of the comparator 12. Note that the signal VCO is set at "H" as its initial value and set at "L" when the magnitude relationship between the ramp signal and the voltage value VSL is inverted. Note that in the example of FIG. 8, the output signal VCO remains at "H" in the P-phase period, which indicates that the magnitude relationship between the ramp signal and the voltage value VSL has not been inverted.

The signal SUNLAT_IN shown on the third-highest side in FIG. 8 is a signal generated by the circuit described above with reference to FIG. 6 and input to the comparator-output latch circuit 101. In the example of FIG. 8, the pulse of the signal SUNLAT_IN is formed at the end time of the P-phase period.

The signal SUNRST_IN shown on the fourth-highest side in FIG. 8 is a signal generated by the circuit described above with reference to FIG. 6 and input to the comparator-output latch circuit 101. In the example of FIG. 8, the pulse of the signal SUNLAT_IN is formed at the start time of the P-phase period.

The signal SUNOUT shown on the fifth-highest side in FIG. 8 is the output of the comparator-output latch circuit 101. In the example of FIG. 8, the signal SUNOUT is set at "H" because the magnitude relationship between the ramp signal and the voltage value VSL has not been inverted.

The signal CLK shown on the sixth-highest side in FIG. 8 serves as the clock signal input to the AND gate 104 shown in FIG. 5. Note that the pulses of the clock signal are omitted in FIG. 8 but a plurality of the clock pulses are actually formed in periods where the signal CLK is set at "H."

The signal CNTEN shown on the seventh-highest side in FIG. 8 serves as the signal output from the OR gate 103 shown in FIG. 5. In the example of FIG. 8, the signal CNTEN is set at "H" in a substantially entire period where the pixels of the one row are read.

The signal CLK_IN shown on the lowest side in FIG. 8 serves as the clock signal input to the counter circuit 102 shown in FIG. 5. Note that the pulses of the clock signal are omitted in FIG. 8 but a plurality of the clock pulses are actually formed in the periods where the signal CLK is set at "H." In the example of FIG. 8, the pulses of the signal CLK_IN are formed at the same timing as the signal CLK.

In the case of FIG. 8, the pulses of the signal CLK_IN are formed even after the output signal VCO has been set at "L" in the D-phase period. That is, the clock signal is fully counted in the D-phase period because the magnitude relationship between the ramp signal and the voltage value VSL has not been inverted in the P-phase period.

As shown in FIG. 8, the blackening correction processing is applied to the pixel signals of the pixels of the rows corresponding to the valid part 51 in a case where the magnitude relationship between the ramp signal and the voltage value VSL has not been inverted in the P-phase period.

Figure 9:
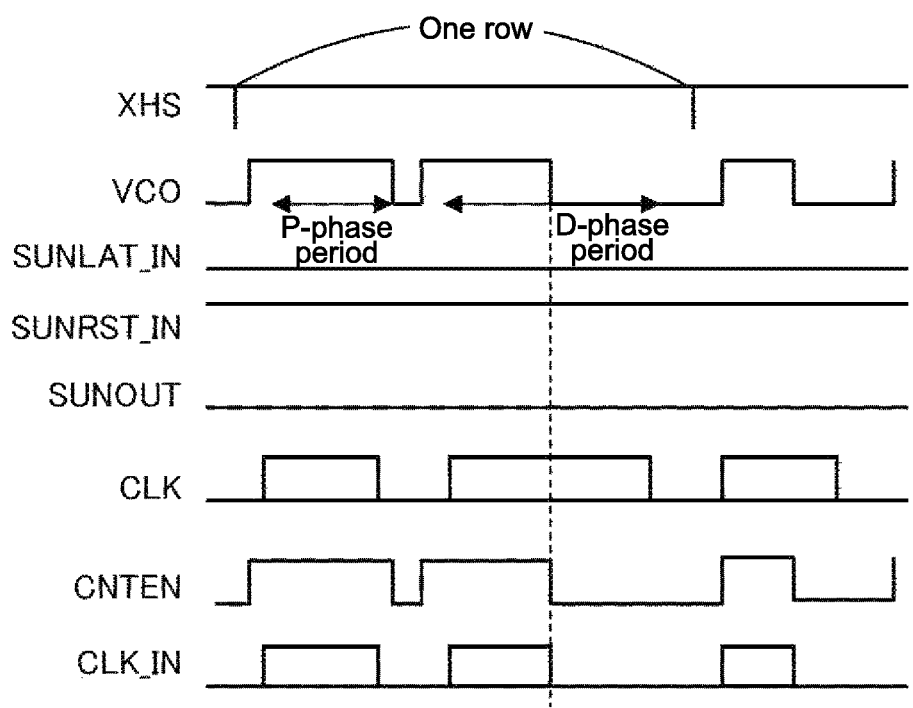
FIG. 9 is a timing chart for explaining the waveforms of the signals in a period where the pixels of rows corresponding to optical black areas are read.

FIG. 9 is a timing chart for explaining the waveforms of the respective signals in a period where the pixels of the rows corresponding to the VOB part 53 are read.

Similar to FIG. 8, in FIG. 9, the horizontal axis shows a time, and the waveforms of the respective signals are arranged in a vertical direction.

Unlike the case of FIG. 8, no pulse of the signal SUNLAT_IN shown on the third-highest side is formed in the example of FIG. 9, and the signal SUNLAT_IN is set at "L" in a substantially entire period where the pixels of one row are read.

In addition, in the case of FIG. 9, no pulse of the signal SUNRST_IN shown on the fourth-highest side is formed, and the signal SUNRST_IN is set at "H" in the substantially entire period where the pixels of the one row are read.

Moreover, in the case of FIG. 9, the signal CNTEN shown on the seventh-highest side changes from "H" to "L" in the middle of the D-phase period. That is, the signal CNTEN also changes from "H" to "L" at a timing at which the signal VCO changes from "H" to "L" in the middle of the D-phase period.

Further, in the case of FIG. 9, no pulse of the signal CLK_IN shown on the lowest side is formed at times after the signal CNTEN has been set at "L." That is, in the case of FIG. 9, no pulse of the signal CLK_IN is formed at the same timing as the signal CLK.

Thus, in the case of FIG. 9, the clock signal is not fully counted in the D-phase period. That is, although the magnitude relationship between the ramp signal and the voltage value VSL has not been inverted in the P-phase period, the clock signal is not fully counted in the D-phase period.

As shown in FIG. 9, the blackening correction processing is not applied to the pixel signals of the pixels of the rows corresponding to the VOB part 53 even if the magnitude relationship between the ramp signal and the voltage value VSL has not been inverted in the P-phase period.

As described above, according to the embodiment of the present disclosure, the timing control circuit 22 controls the signal SUNEN such that it is generally set at "H" but set at "L" only when the pixels of the rows corresponding to the VOB part 53 of the pixel array 11 are read. Thus, the blackening correction processing is applied to the pixel signals of the pixels of the valid part 51 but not applied to the pixel signals of the pixels of the rows corresponding to the VOB part 53.

Figure 10:
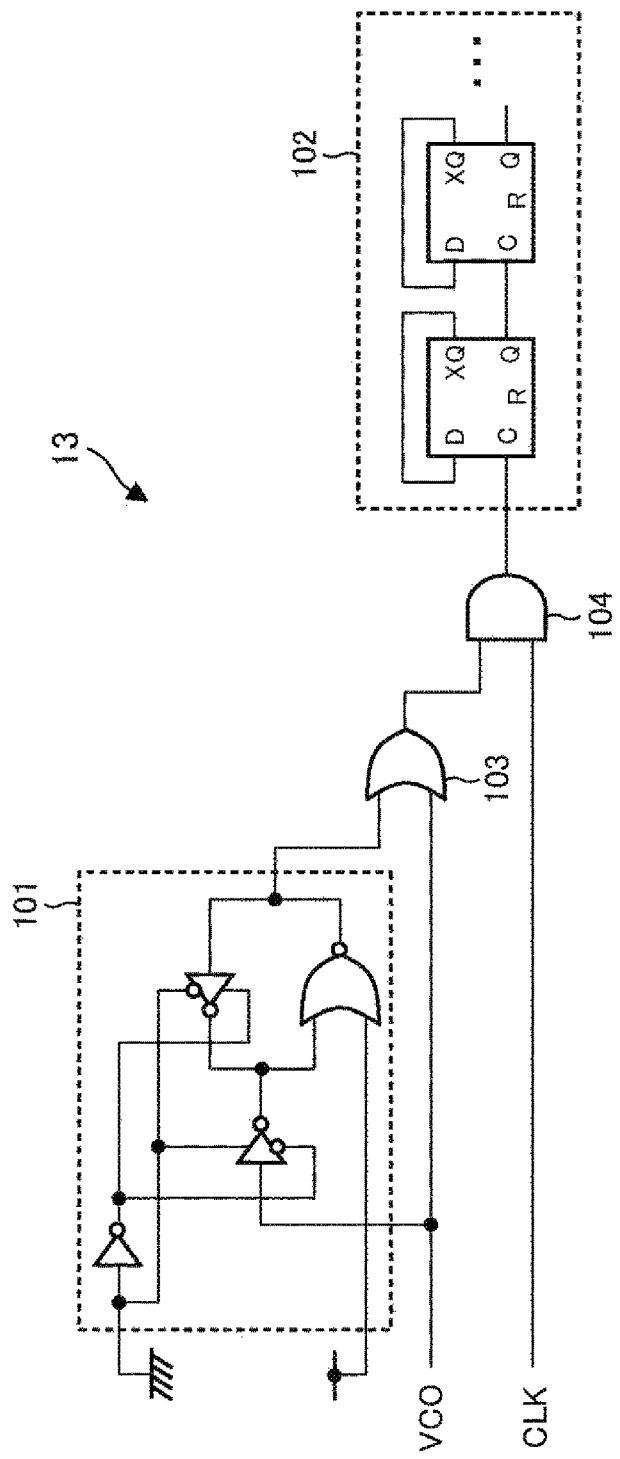
FIG. 10 is a circuit diagram showing an example of the inner configuration of the up/down counters corresponding to an HOB area.

On the other hand, according to the embodiment of the present disclosure, the inner configuration of the up/down counters 13 is configured as shown in FIG. 10, thereby preventing the blackening correction processing from being applied to the pixel signals of the pixels of the HOB part 52.

FIG. 10 is a circuit diagram showing an example of the inner configuration of the up/down counters 13. FIG. 10 is the diagram corresponding to the diagram shown in FIG. 5, and the same parts as those of FIG. 5 are denoted by the same symbols. In the case of the example of FIG. 10, the configuration of the comparator-output latch circuit 101 is different from that of the comparator-output latch circuit 101 shown in FIG. 5.

That is, in the case of the example of FIG. 10, a terminal to which the signal SUNLAT_IN is input in FIG. 5 is connected to GND (ground). In addition, in the case of the example of FIG. 10, a terminal to which the signal SUNRST_IN is input in FIG. 5 is connected to a power supply. Thus, the signal SUNLAT_IN can be consistently set at "L," and the signal SUNRST_IN can be consistently set at "H."

As a result, the up/down counter 13 operates in the manner described above with reference to FIG. 9, thereby consistently preventing the blackening correction processing from being applied to the pixel signal of the pixel connected to the up/down counters 13 shown in FIG. 10.

As described above with reference to FIG. 1, the up/down counters 13 are provided corresponding to the vertical signal lines. Therefore, the up/down counters 13 provided on the vertical signal lines corresponding to the columns of the pixels of the HOB part 52 of the pixel array 11 are configured as shown in FIG. 10. For example, it is assumed that the number of the columns of the pixels of the pixel array 11 is n and the pixels of the first to fifth columns are the pixels of the HOB part 52. In this case, the up/down counters 13-1 to 13-5 are configured as shown in FIG. 10, and the up/down counters 13-6 to 13-n are configured as shown in FIG. 5.

As described above, according to the embodiment of the present disclosure, the blackening correction control circuit 31 of the timing control circuit 22 controls the signal SUNEN, thereby preventing the blackening correction processing from being applied to the pixel signals of the pixels of the rows corresponding to the VOB part 53. In addition, according to the embodiment of the present disclosure, the configuration of the up/down counters 13 corresponding to the predetermined vertical signal lines are made different from that of the other up/down counters 13, thereby preventing the blackening correction processing from being applied to the pixels of the HOB part 52.

Figure 11:
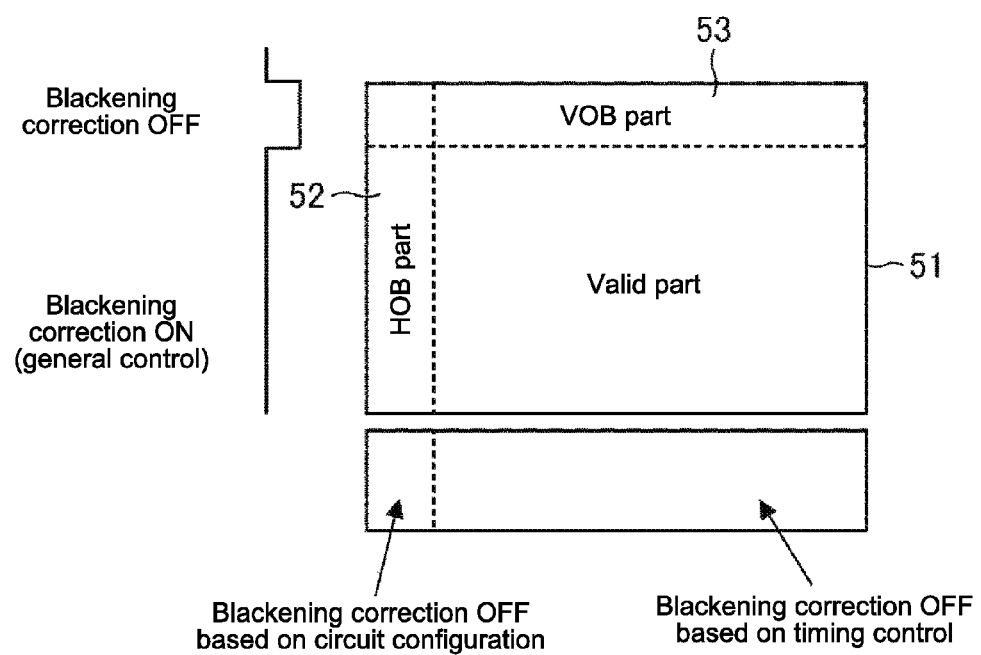
FIG. 11 is a diagram for explaining whether blackening correction processing according to the embodiment of the present disclosure is applied to the respective areas of the pixel array.

FIG. 11 is a diagram for explaining whether the blackening correction processing according to the embodiment of the present disclosure is applied to the respective areas of the pixel array. In FIG. 11, the application and non-application of the blackening correction processing to the valid part 51, the HOB part 52, and the VOB part 53 of the pixel array 11 are indicated as "blackening correction ON" and "blackening correction OFF," respectively.

That is, in a vertical direction in FIG. 11, the VOB part 53 becomes an area of the blackening correction OFF (where the blackening correction processing is not applied), and the valid part 51 becomes an area of the blackening correction ON (where the blackening correction processing is applied).

Further, in a horizontal direction in FIG. 11, the HOB part 52 becomes an area of the blackening correction OFF (where the blackening correction processing is not applied). At this time, the configuration of the up/down counters 13 corresponding to the predetermined vertical signal lines is made different from that of the other up/down counters 13 as described above, thereby preventing the blackening correction processing from being applied to the pixels of the HOB part 52. That is, in the horizontal direction, the HOB part 2 becomes the area of the blackening correction OFF based on the circuit configuration.

In addition, in the vertical direction in FIG. 11, the valid part 51 becomes the area of the blackening correction ON (where the blackening correction processing is applied). At this time, the blackening correction control circuit 31 of the timing control circuit 22 controls the signal SUNEN as described above, thereby preventing the blackening correction processing from being applied to the pixel signals of the pixels of the rows corresponding to the VOB part 53. That is, in the vertical direction, the VOB part 53 becomes the area of the blackening correction OFF based on timing control.

Therefore, according to the embodiment of the present disclosure, the blackening correction processing can be applied to the valid part 51 but can be prevented in the optical black areas (the HOB part 52 and the VOB part 53). Thus, natural and beautiful images can be obtained with an image sensor.

Note that the application of the embodiment of the present disclosure is not limited to, for example, a solid-state imaging device such as a CMOS image sensor. That is, the embodiment of the present disclosure is applicable to any electronic apparatuses using solid-state imaging devices as image capturing parts (photoelectric conversion parts), such as imaging apparatuses like digital still cameras and video cameras, mobile terminal apparatuses having an imaging function, and copiers using solid-state imaging devices as image reading parts. The solid-state imaging devices may be a one-chip form, a form where a plurality of chips are laminated or adjacently arranged, or a module-like form having an imaging function where an imaging part and a signal processing part or an optical system are integrated and packaged.

Figure 12:
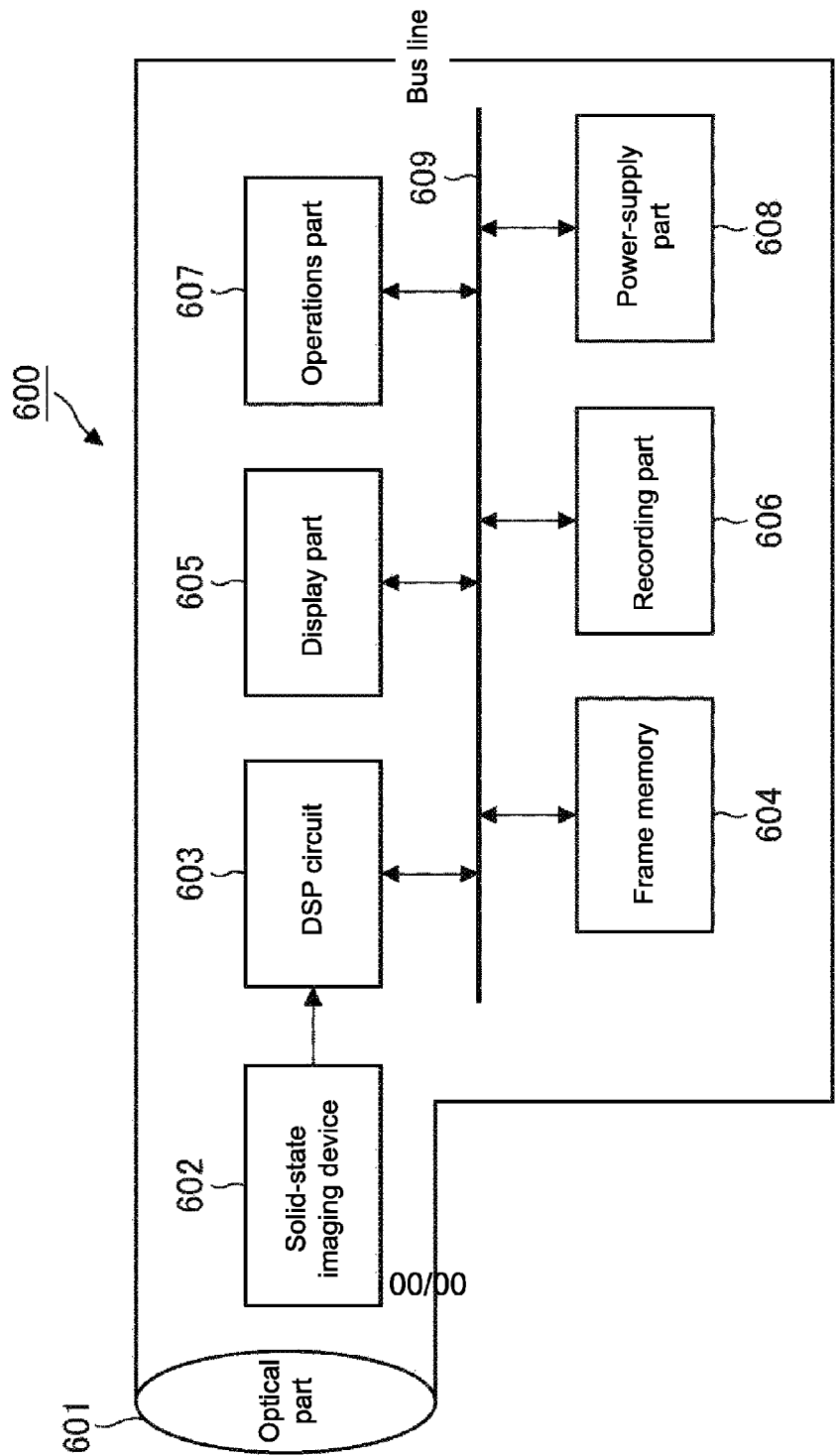
FIG. 12 is a block diagram showing a configuration example of an imaging apparatus serving as an electronic apparatus to which the embodiment of the present disclosure is applied.

FIG. 12 is a block diagram showing a configuration example of an imaging apparatus serving as an electronic apparatus to which the embodiment of the present disclosure is applied.

An imaging apparatus 600 shown in FIG. 12 has an optical part 601 composed of a lens group and the like, a solid-state imaging device (imaging device) 602 that employs the respective configurations of the pixels described above, and a DSP (Digital Signal Processing) circuit 603 serving as a camera signal processing circuit. In addition, the imaging apparatus 600 has a frame memory 604, a display part 605, a recording part 606, an operations part 607, and a power-supply part 608. The DSP circuit 603, the frame memory 604, the display part 605, the recording part 606, the operations part 607, and the power-supply part 608 are connected to each other via a bus line 609.

The optical part 601 receives incident light (image light) from an object to form an image on the imaging surface of the solid-state imaging device 602. The solid-state imaging device 602 converts a light amount of the incident light, which is formed into the image on the imaging surface by the optical part 601, into an electric signal per pixel and outputs the electric signal as a pixel signal. As the solid-state imaging device 602, a solid-state imaging device such as the CMOS image sensor 10 according to the embodiment described above, e.g., a solid-state imaging device capable of appropriately preventing the blackening phenomenon even if the respective pixels are irradiated with high illumination light such as sunlight can be used.

The display part 605 is composed of, for example, a panel display unit such as a liquid crystal panel and an organic EL (Electro Luminescence) panel and displays moving images or still images imaged by the solid-state imaging device 602 thereon. The recording part 606 records the moving images or the still images imaged by the solid-state imaging device 602 on recording media such as video tapes and DVDs (Digital Versatile Disks).

The operations part 607 issues operating commands on various functions of the imaging apparatus 600 under user's operations. The power-supply part 608 appropriately supplies various power supplies serving as power supplies for operating the DSP circuit 603, the frame memory 604, the display part 605, the recording part 606, and the operations part 607 to such objects.

As described above, when the CMOS image sensor 10 according to the embodiment is used as the solid-state imaging device 602, it becomes possible to accurately eliminate reset noise at the extraction of a first pixel signal and a second pixel signal without adding a signal. Therefore, in the imaging apparatus 600 such as a video camera, a digital still camera, and a camera module for mobile equipment such as a mobile phone, the high quality of an imaging image can be achieved.

In addition, the embodiment described above is applied to the CMOS image sensor where the unit pixels that detect signal charges corresponding to light amounts of visible light as physical amounts are arranged in the matrix form. The embodiment of the present disclosure is not limited to the CMOS image sensor but is applicable to any column-type solid-state imaging devices where a column processing part is arranged for each pixel column in a pixel array part.

Moreover, the embodiment of the present disclosure is not limited to solid-state imaging devices that detect the distribution of incident light amounts of visible light to be imaged as images but is applicable to solid-state imaging devices that detect the distribution of incident light amounts of infrared rays, X rays, particles, or the like to be imaged as images. Furthermore, in a broad sense, the embodiment of the present disclosure is applicable to any solid-state imaging devices (physical-amount distribution detectors) such as finger print detection sensors that detect the distribution of other physical amounts such as pressures and capacitances to be imaged as images.

Note that a series of the processing described above in the specification includes not only processing chronologically performed in the described order but also processing not chronologically performed but performed in parallel or separately.

Furthermore, the embodiment of the present disclosure is not limited to the one described above and may be modified in various ways without departing from the sprit of the present disclosure.

Note that the present disclosure may also employ the following configurations.

(1) A solid-state imaging device, including:
a pixel array having a plurality of pixels arranged therein, each of the pixels having a charge holding part configured to hold a voltage corresponding to a charge obtained by a photoelectric conversion part;
a pixel signal generation part configured to generate a pixel signal by calculating a difference between a signal level representing the voltage held by the charge holding part so as to correspond to the charge obtained by the photoelectric conversion part of the pixel and a reset level representing a voltage of the charge holding part in a reset state; and
a control part configured to control the pixel signal generation part,
the pixel signal generation part including
a comparator configured to compare the voltage of the charge holding part with a reference voltage, and
a counter configured to count a clock in accordance with a comparison result output from the comparator,
a count value of the counter in a D-phase period where the signal level is detected being set as a limit value regardless of an output of the comparator when a count value of the counter in a P-phase period where the reset level is detected is a limit value, in a case where an enable signal is supplied from the control part.

(2) The solid-state imaging device according to (1), in which
the pixel array has the plurality of pixels arranged in a two-dimensional matrix form,
the pixel signal generation part is provided for each of columns of the pixels of the pixel array, and
the counter of the pixel signal generation part provided corresponding to a predetermined one of the columns of the pixel array is configured to count the clock in accordance with the output of the comparator in the D-phase period regardless of whether the enable signal is supplied from the control part.

(3) The solid-state imaging device according to (2), in which
the pixels of the predetermined column of the pixel array are pixels of an optical black area.

(4) The solid-state imaging device according to any one of (1) to (3), in which
the pixel array has the plurality of pixels arranged in a two-dimensional matrix form,
the pixel signal generation part is provided for each of columns of the pixels of the pixel array, and
the control part is configured to output the enable signal when the pixel signal generation part is configured to generate the pixel signal related to the pixels of a predetermined one of rows.

(5) The solid-state imaging device according to (4), in which
the pixels of the predetermined row are pixels of a non-optical black area.

(6) The solid-state imaging device according to any one of (1) to (5), in which
a blackening phenomenon occurring when the charge photoelectrically converted by the photoelectric conversion part leaks to the charge holding part is corrected by the supply of the enable signal from the control part.

(7) A driving method, including:
arranging a plurality of pixels in a pixel array, each of the pixels having a charge holding part configured to hold a voltage corresponding to a charge obtained by a photoelectric conversion part;
generating, by a pixel signal generation part, a pixel signal by calculating a difference between a signal level representing the voltage held by the charge holding part so as to correspond to the charge obtained by the photoelectric conversion part of the pixel and a reset level representing a voltage of the charge holding part in a reset state; and
controlling, by a control part, the pixel signal generation part,
the pixel signal generation part including a comparator configured to compare the voltage of the charge holding part with a reference voltage, and a counter configured to count a clock in accordance with a comparison result output from the comparator, a count value of the counter in a D-phase period where the signal level is detected being set as a limit value regardless of an output of the comparator when a count value of the counter in a P-phase period where the reset level is detected is a limit value, in a case where an enable signal is supplied from the control part.

(8) An electronic apparatus, including:

a solid-state imaging device including a pixel array having a plurality of pixels arranged therein, each of the pixels having a charge holding part configured to hold a voltage corresponding to a charge obtained by a photoelectric conversion part, a pixel signal generation part configured to generate a pixel signal by calculating a difference between a signal level representing the voltage held by the charge holding part so as to correspond to the charge obtained by the photoelectric conversion part of the pixel and a reset level representing a voltage of the charge holding part in a reset state, and a control part configured to control the pixel signal generation part, the pixel signal generation part including a comparator configured to compare the voltage of the charge holding part with a reference voltage, and a counter configured to count a clock in accordance with a comparison result output from the comparator, a count value of the counter in a D-phase period where the signal level being detected is set as a limit value regardless of an output of the comparator when a count value of the counter in a P-phase period where the reset level is detected is a limit value, in a case where an enable signal is supplied from the control part.

The present disclosure contains subject matter related to that disclosed in Japanese Priority Patent Application JP 2012-057116 filed in the Japan Patent Office on Mar. 14, 2012, the entire content of which is hereby incorporated by reference.

What is claimed is:

1. A solid-state imaging device, comprising:

a pixel array having a plurality of pixels arranged therein, each of the pixels having a charge holding part configured to hold a voltage corresponding to a charge obtained by a photoelectric conversion part;

a pixel signal generation part configured to generate a pixel signal by calculating a difference between a signal level representing the voltage held by the charge holding part so as to correspond to the charge obtained by the photoelectric conversion part of the pixel and a reset level representing a voltage of the charge holding part in a reset state; and a control part configured to control the pixel signal generation part, the pixel signal generation part including a comparator configured to compare the voltage of the charge holding part with a reference voltage, and a counter configured to count a clock in accordance with a comparison result output from the comparator, a count value of the counter in a D-phase period where the signal level is detected being set as a limit value regardless of an output of the comparator when a count value of the counter in a P-phase period where the reset level is detected is a limit value, in a case where an enable signal is supplied from the control part.

2. The solid-state imaging device according to claim 1, wherein the pixel array has the plurality of pixels arranged in a two-dimensional matrix form, the pixel signal generation part is provided for each of columns of the pixels of the pixel array, and the counter of the pixel signal generation part provided corresponding to a predetermined one of the columns of the pixel array is configured to count the clock in accordance with the output of the comparator in the D-phase period regardless of whether the enable signal is supplied from the control part.

3. The solid-state imaging device according to claim 2, wherein the pixels of the predetermined column of the pixel array are pixels of an optical black area.

4. The solid-state imaging device according to claim 1, wherein the pixel array has the plurality of pixels arranged in a two-dimensional matrix form, the pixel signal generation part is provided for each of columns of the pixels of the pixel array, and the control part is configured to output the enable signal when the pixel signal generation part is configured to generate the pixel signal related to the pixels of a predetermined one of rows.

5. The solid-state imaging device according to claim 4, wherein the pixels of the predetermined row are pixels of a non-optical black area.

6. The solid-state imaging device according to claim 1, wherein a blackening phenomenon occurring when the charge photoelectrically converted by the photoelectric conversion part leaks to the charge holding part is corrected by the supply of the enable signal from the control part.

7. A driving method, comprising:

arranging a plurality of pixels in a pixel array, each of the pixels having a charge holding part configured to hold a voltage corresponding to a charge obtained by a photoelectric conversion part;

generating, by a pixel signal generation part, a pixel signal by calculating a difference between a signal level representing the voltage held by the charge holding part so as to correspond to the charge obtained by the photoelectric conversion part of the pixel and a reset level representing a voltage of the charge holding part in a reset state; and controlling, by a control part, the pixel signal generation part, the pixel signal generation part including a comparator configured to compare the voltage of the charge holding part with a reference voltage, and a counter configured to count a clock in accordance with a comparison result output from the comparator, a count value of the counter in a D-phase period where the signal level is detected being set as a limit value regardless of an output of the comparator when a count value of the counter in a P-phase period where the reset level is detected is a limit value, in a case where an enable signal is supplied from the control part.

8. An electronic apparatus, comprising:

a solid-state imaging device including a pixel array having a plurality of pixels arranged therein, each of the pixels having a charge holding part configured to hold a voltage corresponding to a charge obtained by a photoelectric conversion part, a pixel signal generation part configured to generate a pixel signal by calculating a difference between a signal level representing the voltage held by the charge holding part so as to correspond to the charge obtained by the photoelectric conversion part of the pixel and a reset level representing a voltage of the charge holding part in a reset state, and a control part configured to control the pixel signal generation part, the pixel signal generation part including a comparator configured to compare the voltage of the charge holding part with a reference voltage, and a counter configured to count a clock in accordance with a comparison result output from the comparator, a count value of the counter in a D-phase period where the signal level is detected being set as a limit value regardless of an output of the comparator when a count value of the counter in a P-phase period where the reset level is detected is a limit value, in a case where an enable signal is supplied from the control part.

* * * * *